United States Patent [19]

Miyoshi et al.

[11] Patent Number: 4,701,364
[45] Date of Patent: Oct. 20, 1987

[54] TAPE FOR CLEANING MAGNETIC HEAD

[75] Inventors: Takahito Miyoshi; Akira Kasuga; Masaaki Fujiyama, all of Odawara, Japan

[73] Assignee: Fuji Photo Film Co., Ltd., Japan

[21] Appl. No.: 863,155

[22] Filed: May 14, 1986

[30] Foreign Application Priority Data

May 15, 1985 [JP] Japan .................................. 60-104551

[51] Int. Cl.$^4$ ................................................ G11B 5/70
[52] U.S. Cl. .................................... 428/141; 428/323; 428/336; 428/480; 428/694; 428/900
[58] Field of Search ............... 428/480, 694, 900, 141, 428/323, 336; 427/128

[56] References Cited

U.S. PATENT DOCUMENTS

| 4,318,957 | 3/1982 | Videc ................................ | 428/694 |
| 4,379,800 | 4/1983 | Sato .................................. | 428/694 |
| 4,442,171 | 4/1984 | Sato et al. ......................... | 428/694 |
| 4,476,177 | 10/1984 | Mizuno et al. ................... | 428/694 |
| 4,547,419 | 10/1985 | Nishimatsu et al. ............. | 428/694 |

Primary Examiner—Paul J. Thibodeau
Attorney, Agent, or Firm—Gerald J. Ferguson, Jr.; Michael P. Hoffman; Ronni S. Malamud

[57] ABSTRACT

A tape for cleaning magnetic head comprising a support and a cleaning layer coated on at least one surface of said support, which is characterized in that said cleaning layer contains a ferromagnetic metal powder as abrasive, the surface of said cleaning layer is a surface of center line average height of not less than 0.025 μm as cut-off value of 0.08 mm, and said tape has a stiffness of not more than 2.

8 Claims, No Drawings

TAPE FOR CLEANING MAGNETIC HEAD

BACKGROUND OF THE INVENTION

1. Field of the Invention

The present invention relates to a tape for cleaning magnetic head of a magnetic recording and reproducing device in which a magnetic recording medium such as an audio tape or a video tape is utilized.

2. Description of Prior Arts

A magnetic recording medium (hereinafter referred to as magnetic tape) such as an audio tape, a video tape or a tape for computer system, comprises a non-magnetic support and a magnetic recording layer containing a ferromagnetic metal oxide powder in the form of needle crystals such as of $\gamma$-$Fe_2O_3$, Co-containing iron oxide or $CrO_2$ dispersed in a binder.

Recently, an 8 mm video tape has been developed, and as a result, requirement of higher density recording has increased. Accordingly, a magnetic tape containing ferromagnetic metal powder which has a high coercive force (Hc) and a high residual flux density (Br) has been used replacing a magnetic tape using the aforementioned tapes with metal oxide powders.

Further, the material of a magnetic head has been studied for improvement to meet the requirements in relation to the aforementioned development of a magnetic recording medium for high density recording. Thus, a magnetic head of an alloy material such as sendust becomes generally employed.

Especially as the material of magnetic head used for an 8 mm video tape recorder (VTR), an alloy such as sendust is now widely employed for improving the reproduction output in replace of the conventional ferrite material. Further, there is an advantage in the use of a magnetic head of this material; that is, a magnetic tape does not need to be placed under high pressure (conventional magnetic head of ferrite-forming material needs to be placed under high pressure), whereby the deterioration of a magnetic tape caused by the contact with a driving device is reduced.

With the empolyment of a magnetic recording medium containing a ferromagnetic metal powder having a high coercive force in combination with a magnetic head of a sendust composite type, it is now possible to fulfill the aforementioned requirements such as those required in the case using an 8 mm video tape recording and reproducing system where high density recording and high reproduction output are necessary.

Nevertheless, there is a problem in the use of a ferromagnetic metal powder. That is, the ferromagnetic metal powder readily drops out of the magnetic recording layer of the magnetic recording medium because of its low hardness. The ferromagnetic metal powder dropped from the magnetic recording layer causes clogging on the magnetic head, which lowers the reproduction output.

Such clogging on the magnetic head is removed by running the so-called cleaning tape in contact with the surface of a magnetic head. The cleaning tape comprises a support and a cleaning layer containing an abrasive of high hardness. By the use of the cleaning tape, the clogging on a magnetic head of a hard ferrite material can be eliminated effectively without damaging the magnetic head. However, a magnetic head of an alloy material such as sendust which has low hardness and very smooth surface is readily injured by the contact of the conventional cleaning tape. The injured surface of a magnetic head causes noise generation and drop-out in the output stage. Therefore, a new cleaning tape which solves this problem is required.

SUMMARY OF THE INVENTION

This invention has an object to provide a cleaning tape, namely, a tape for cleaning magnetic head, which can obviate clogging on a magnetic head within a short period of time without damaging the magnetic head.

The invention particularly has an object to provide a cleaning tape which is advantageously employable for cleaning a magnetic head which is used in a running procedure in contact with a magnetic recording medium at a low contact pressure.

The invention further has an object to provide a cleaning tape which is advantageously employable for cleaning a magnetic head having low hardness, whereby removing stains deposited on the magnetic head so as to obviate the clogging within a short period of time without damaging the head.

The present invention resides in a tape for cleaning magnetic head comprising a support and a cleaning layer coated on at least one surface of said support, which is characterized in that said cleaning layer contains a ferromagnetic metal powder as abrasive, the surface of said cleaning layer has a surface of center line average height of not less than 0.025 $\mu$m at cut-off value of 0.08 mm, and said tape has a stiffness of not more than 2.

DETAILED DESCRIPTION OF THE INVENTION

The cleaning tape of the present invention has a basic structure comprising a support and a cleaning layer coated on said support which contains an abrasive dispersed in a binder.

A support generally used for the conventional cleaning tape can also be used as the support of the invention. Examples of the materials which can be used for the support include films of synthetic resin (e.g. polyethylene terephthalate, polypropylene, polycarbonate, polyethylene naphthalate, polyamide, polyamideimide and polyimide) and metal foils (e.g. aluminum foil and stainless foil). The thickness of the support is preferably in the range of 2 to 8 $\mu$m.

Since the cleaning tape of the invention needs to be limp, it is desired to select the support having a low rigidity with a required mechanical strength. The support employable in the invention preferably has a stiffness (STD) of not more than 1.8. The stiffness is a value defined in accordance with ASTM D-747-20, and can be measured by a stiffness measuring device manufactured by Tinus Olsen Testing Machine Co., Inc. In the measurement with the measuring device, a distance between a clamp and a loading plate is set to be 0.14 inch, and six sample tapes (length: ½ inch, width: ½ inch) in the superposed form are bent at 20 degrees to determine the stiffness of the sample tape. The temperature is 25° C. and the humidity is 65% RH in the measuring procedure. The bending moment in full scale is set to be 0.005 in. ·1lb.

On the support is provided a cleaning layer. The cleaning layer may be provided on one surface of the support, or may be provided on both surfaces thereof. When one surface of the support is provided with the cleaning layer, another surface of the support where the cleaning layer is not coated may be provided with a backing layer.

The cleaning layer of the cleaning tape according to the invention contains a ferromagnetic metal powder, and the ferromagnetic metal powder serves as abrasive. This ferromagnetic metal powder for serving as abrasive is dispersed in a binder to form a cleaning layer. The ferromagnetic metal powder contained in the cleaning layer preferably has a specific surface area (S-BET) in the range of 40–65 m$^2$/g.

As a ferromagnetic metal powder employed as abrasive in the cleaning layer, there can be mentioned a ferromagnetic alloy powder containing a metal component of at least 75 wt.% in which at least 80 wt.% of the metal component comprises at least one ferromagnetic metal or metal alloy (e.g., Fe, Co, Ni, Fe-Co, Fe-Ni, Co-Ni or Co-Ni-Fe) and the remaining metal component, if present, comprises other atom(s) (e.g., Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, or P). The ferromagnetic metal component may contain a small amount of water, hydroxide, or oxide. These ferromagnetic metal powders are already known, and can be prepared by known methods. The ferromagnetic metal powder employable as an abrasive in the invention can be also prepared according to the known methods.

The ferromagnetic metal powder generally is in any shape such as needle shape, grain shape, dice shape, rice shape or plate shape.

The ferromagnetic metal powder employed as abrasive in the cleaning tape of the invention preferably is in a needle shape. A ferromagnetic metal powder of the needle shape generally has an average longitudinal length ranging from 0.10 to 0.30 $\mu$m, preferably from 0.15 to 0.25 $\mu$m, and an average width length ranging from 0.015 to 0.030, preferably 0.020 to 0.025 $\mu$m. Such ferromagnetic metal powder is composed essentially of needle crystals having a longitudinal length in the range of 0.03 to 0.55 $\mu$m, particularly in the range of 0.07 to 0.47 $\mu$m, and a width length in the range of 0.010 to 0.045 $\mu$m, particularly 0.013 to 0.033 $\mu$m.

The ferromagnetic metal powder is used as an abrasive of the cleaning layer according to the invention as described above, but other conventional abrasive such as alumina, chromic oxide, and $\alpha$-iron oxide can be employed in combination therewith in an small amount (e.g., amount of not more than 10 wt.%, preferably not more than 5 wt.%, of the ferromagnetic metal powder), so far as the employment of such conventional abrasive with the ferromagnetic metal powder does not disturb the objects of the invention. Carbon black is also preferably employed in combination with the ferromagnetic metal powder in an small amount (e.g., amount of not more than 10 wt.%, preferably not more than 5 wt.%, of the ferromagnetic metal powder).

The binder employable in the formation of the cleaning layer of the invention can be chosen from known binder materials used for a magnetic recording medium such as thermoplastic resins, thermosetting resins and reactive resins. These resins can be used singly or in combination in the present invention.

The ratio between the abrasive (ferromagnetic metal powder) and the binder in the cleaning layer is preferably within the range of from 100:10 to 100:50 (abrasive:- binder, by weight).

The cleaning tape of the invention can be produced by a process as described below.

In the first place, the above-mentioned ferromagnetic metal powder and binder are added to an appropriate solvent, and they are kneaded to prepare a coating dispersion for the formation of a cleaning layer. As the solvent employable in the invention, there can be mentioned a solvent such as methyl ethyl ketone which is conventionally used in the preparation of a magnetic paint of a magnetic recording medium. A kneading method or the order of addition of each component can be appropriately selected. In the preparation of the coating dispersion for the cleaning layer, other optional additives such as dispersing agent, antistatic agent and lubricant can be incorporated into the dispersion.

In the second place, the coating dispersion prepared as above is applied onto the aforementioned support and then dried to form a cleaning layer. Generally, a cleaning layer is formed by applying the coating dispersion directly on the support, but it is also possible to provide an adhesive layer or a subbing layer between the cleaning layer and the support.

The cleaning layer generally has a thickness (after dryness) of approx. 1 to 10 $\mu$m, preferably approx. 2.0 to 7.0 $\mu$m.

Then the cleaning layer is, if necessary, subjected to a surface smoothing processing such as calendering.

The cleaning layer of the cleaning tape according to the invention is required to have a surface of center line average height (Ra value) of not less than 0.025 $\mu$m at cut-off value of 0.08 mm. When the Ra value is less than 0.025 $\mu$m, the surface of the cleaning layer becomes too smooth to accomplish efficient cleaning, and the clogging on the magnetic head cannot be removed within a short period of time. The Ra value is preferably less than 0.04 $\mu$m.

The center line average height of the surface of the cleaning layer can be set to a value within the desired range by selecting a support material in consideration of the center line average height, adjusting the ratio between the abrasive and the binder, controlling the manufacturing process which may or may not include the calendering processing, or by controlling the temperature and pressure in the processing.

The cleaning tape of the invention is adjusted to have a stiffness of not more than 2. The stiffness is expressed by a value determined according to the aforementioned measurement.

The stiffness of the cleaning tape can be desirably determined by adjusting a stiffness of the support to be employed (e.g., selecting material and thickness of the support), adjusting composition of the cleaning layer (e.g., selecting kinds of the ferromagnetic metal powder and binder, and the ratio therebetween), or adjusting the thickness of the cleaning layer.

Thus processed tape in which a cleaning layer has a surface of preferred center line average height is then slit to have a desired shape.

The cleaning tape of the invention can remove stains on a magnetic head within a short period of time without damaging the magnetic head. Particularly, the cleaning tape of the invention effectively functions as a tape for cleaning a magnetic head which is used in contact with a magnetic recording medium at a low contact pressure in an 8 mm video tape recorder system. Further, even the stains deposited on a magnetic head having low hardness such as a sendust composite type magnetic head can be removed within a short period of time without damaging the magnetic head.

The cleaning tape of the invention is also effective to avoid clogging on a magnetic head in a short period of time, and hardly injures the magnetic head in the removing procedure. The cleaning tape of the invention is especially suitable for cleaning a magnetic head of alloy material having low hardness such as a sendust composite type head which is generally used in the 8 mm video tape recorder system. Further, since the cleaning tape of the invention can be made very thin, the tape can run in contact with a magnetic head very closely and uniformly. Thus, cleaning can be performed effectively.

In addition, the cleaning tape of the invention can be used effectively is a video tape recorder system for commercial use requiring high reproduction output such as one used in a broadcasting center.

Hereinbefore, the description of the cleaning tape is mainly given with respect to the application of an 8 mm video recording system, but the cleaning tape of the invention can also be applied to the conventional ½ inch video tape recording system.

Examples and comparison examples which illustrate the present invention are given in the following.

The term "part" used in the examples is used to mean "part by weight", unless otherwise specified.

EXAMPLE 1

The components indicated below were mixed to to give a dispersion.

| | |
|---|---|
| Ferromagnetic alloy powder (Fe—Ni alloy Fe: approx. 95 wt. %, Ni: approx. 5 wt. % specific surface area (S-BET): 45 m$^2$/g average longitudinal length: 0.25 μm, average width length: 0.02 μm) | 100 parts |
| Vinyl chloride/vinyl acetate/maleic anhydride copolymer (400 × 110A, available from Japan Geon Co., Ltd.) | 7 parts |
| Polyurethane resin (N-2301, available from Japan Polyurethane Co., Ltd.) | 16 parts |
| Carbon black (mean particle size: 40 mμ) | 1 part |
| Al$_2$O$_3$ | 1 part |
| Stearic acid | 1 part |
| Oleic acid | 1 part |
| Butyl stearate | 1 part |
| Methyl ethyl ketone | 500 parts |

To the above dispersion was added the following curing composition.

| | |
|---|---|
| Polyisocyanate (Coronate L, available from Japan Polyurethane Co., Ltd.) | 7 parts |
| Methyl ethyl ketone | 500 parts |

The resulting mixture was kneaded to give a coating dispersion for the formation of a cleaning layer. The coating dispersion was applied onto a polyethylene terephthalate support (thickness: 6 μm) in such a manner that the resulting cleaning layer would have thickness of 5 μm (thickness in dry state).

The coated layer was dried to give a cleaning layer, and the cleaning layer was then subjected to a calendering process at a linear pressure of 80 kg/cm and a rate of 50 m/min.

The resulting sheet was slit to give a cleaning tape for the 8 mm video system.

COMPARISON EXAMPLE 1

The procedure of Example 1 was repeated except for applying a calendering process to the cleaning layer at a linear pressure of 200 kg/cm and a rate of 50 m/min, to prepare a cleaning tape for the 8 mm video system.

COMPARISON EXAMPLE 2

The components indicated below were mixed to to give a dispersion.

| | |
|---|---|
| Ferromagnetic alloy powder (Fe—Ni alloy Fe: approx. 95 wt. %, Ni: approx. 5 wt. % specific surface area (S-BET): 45 m$^2$/g average longitudinal length: 0.25 μm, average width length: 0.02 μm) | 100 parts |
| Vinyl chloride/vinyl acetate/maleic anhydride copolymer (400 × 110A, available from Japan Geon Co., Ltd.) | 11 parts |
| Polyurethane resin (N-2301, available from Japan Polyurethane Co., Ltd.) | 11 parts |
| Carbon black (mean particle size: 40 mμ) | 1 part |
| Al$_2$O$_3$ | 1 part |
| Stearic acid | 1 part |
| Oleic acid | 1 part |
| Butyl stearate | 1 part |
| Methyl ethyl ketone | 500 parts |

To the above dispersion was added the following curing composition.

| | |
|---|---|
| Polyisocyanate (Coronate L, available from Japan Polyurethane Co., Ltd.) | 7 parts |
| Methyl ethyl ketone | 500 parts |

The resulting mixture was kneaded to give a coating dispersion for the formation of a cleaning layer. The coating dispersion was applied onto a polyethylene terephthalate support (thickness: 10 μm) in such a manner that the resulting cleaning layer would have thickness of 5 μm (thickness in dry state).

The coated layer was dried to give a cleaning layer, and the cleaning layer was then subjected to a calendering process at a linear pressure of 80 kg/cm and a rate of 50 m/min.

The resulting sheet was slit to give a cleaning tape for the 8 mm video system.

COMPARISON EXAMPLE 3

The procedure of Comparison Example 2 was repeated except for applying a calendering process to the cleaning layer at a linear pressure of 200 kg/cm and a rate of 50 m/min, to prepare a cleaning tape for the 8 mm video system.

EVALUATION

The cleaning tapes obtained in the above-described examples were evaluated on the cleaning properties by way of observation of the effect of cleaning a magnetic head and the occurrence of damage on the head in the following manner.

Several magnetic heads of sendust composite type having on their surfaces a certain amount of stains (clogging on a magnetic head) deposited by running an 8 mm video tape containing a ferromagnetic metal powder for a certain period of time were prepared. The cleaning tape to be tested was run in contact with the magnetic head to remove the stains deposited on the magnetic head. The time required to remove the stains was measured.

The stiffness of the cleaning tapes was measured by means of the aforementioned stiffness measuring device (manufactured by Tinus Olsen Testing Machine Co., Inc.) according to ASTM D-747-20. The center line average height (Ra value) was determined using a feeler-type surface roughness measuring device (Surfcom 800A-type, manufactured by Tokyo Precision Co., Ltd.) at cut-off value of 0.08 mm.

The results are set forth in Table 1.

TABLE 1

|  | Ex. 1 | Com. Ex. 1 | Com. Ex. 2 | Com. Ex. 3 |
|---|---|---|---|---|
| Stiffness of Support | 0.5 | 0.5 | 1.3 | 1.3 |
| Stiffness of Tape | 1.8 | 1.8 | 2.5 | 2.5 |
| Ra Value | 0.03 | 0.02 | 0.03 | 0.02 |
| Removal of Stains (sec.) | 8 | 15 | 11 | 20 |
| Damage on Head | none | none | observed | none |

What is claimed is:

1. A tape for cleaning magnetic heads comprising a support and a cleaning layer coated on at least one surface of said support, which is characterized in that said cleaning layer contains a ferromagnetic metal powder as abrasive, the surface of said cleaning layer is a surface of center line average height of not less than 0.025 $\mu$m at cut-off value of 0.08 mm, and said tape has a stiffness of not more than 2.

2. The tape as claimed in claim 1, wherein said ferromagnetic metal powder contained in the cleaning layer has a specific surface area in the range of 40 to 65 m$^2$/g.

3. The tape as claimed in claim 1, wherein said support has a thickness of not larger than 8 $\mu$m.

4. The tape as claimed in claim 3, wherein the thickness of said support is in the range of 2 to 8 $\mu$m.

5. The tape as claimed in claim 1, wherein said cleaning layer has a thickness in the range of 1 to 10 $\mu$m.

6. The tape as claimed in claim 1, wherein said support has a stiffness of not more than 1.8.

7. The tape as claimed in claim 1, wherein said support is made of a polyethylene terephthalate sheet.

8. The tape as claimed in claim 1, wherein the surface of center line average height is less than 0.04 $\mu$m.

* * * * *